US011909440B2

(12) United States Patent
You et al.

(10) Patent No.: US 11,909,440 B2
(45) Date of Patent: Feb. 20, 2024

(54) VISIBLE LIGHT COMMUNICATION SYSTEM WITH ADAPTIVE DIMMING AND MODULATION AND DEMODULATION METHOD

(71) Applicant: SOOCHOW UNIVERSITY, Suzhou (CN)

(72) Inventors: Xiaodi You, Suzhou (CN); Chaoran Xiong, Suzhou (CN); Gangxiang Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 46 days.

(21) Appl. No.: 17/801,501

(22) PCT Filed: Apr. 20, 2021

(86) PCT No.: PCT/CN2021/088356
§ 371 (c)(1),
(2) Date: Aug. 22, 2022

(87) PCT Pub. No.: WO2022/188243
PCT Pub. Date: Sep. 15, 2022

(65) Prior Publication Data
US 2023/0283373 A1 Sep. 7, 2023

(30) Foreign Application Priority Data
Mar. 12, 2021 (CN) .......................... 202110272247.9

(51) Int. Cl.
*H04B 10/116* (2013.01)
(52) U.S. Cl.
CPC ................. *H04B 10/116* (2013.01)
(58) Field of Classification Search
CPC ...... H04B 10/116; Y02B 20/40; H04L 1/0003
(Continued)

(56) References Cited

U.S. PATENT DOCUMENTS

| | | | | |
|---|---|---|---|---|
| 8,253,349 B2 * | 8/2012 | Shteynberg | ............ | H05B 45/24 315/307 |
| 2008/0116818 A1 * | 5/2008 | Shteynberg | ............ | H05B 45/46 315/192 |

(Continued)

FOREIGN PATENT DOCUMENTS

| CN | 105323003 A | * 2/2016 | ........... H04B 10/116 |
|---|---|---|---|
| CN | 105323003 A | 2/2016 | |

(Continued)

OTHER PUBLICATIONS

Xiaodi You, "Research on key signal processing schemes in indoor visible light or coherent optical fiber based communication systems" Dissertation for the Degree of Doctor of Philosophy, Nanjing University of Posts and Telecommunications (Feb. 29, 2020).

*Primary Examiner* — Abbas H Alagheband
(74) *Attorney, Agent, or Firm* — SZDC Law PC

(57) ABSTRACT

The invention provides a visible light communication system with adaptive dimming and a modulation and demodulation method. The system includes: a source; an adaptive M-PAM modulator, separately modulating a signal transmitted by the signal source into a first and a second electrical signal; and a dual-path pulse generator, alternately generating a first and a second pulse control signal, where the first and the second pulse control signal are both periodic signals, where when a remaining operating duration of a high level of the first pulse control signal equals to a time of a rising edge of the second pulse control signal, the second pulse control signal starts to be generated, and when a remaining operating duration of a high level of the second pulse control signal is equal to a time of a rising edge of the first pulse control signal, the first pulse control signal starts to be generated.

10 Claims, 4 Drawing Sheets

(58) Field of Classification Search
USPC .......................................................... 398/118
See application file for complete search history.

(56) References Cited

U.S. PATENT DOCUMENTS

| | | | |
|---|---|---|---|
| 2012/0257901 A1* | 10/2012 | Yamada | H04B 10/116 |
| | | | 398/189 |
| 2016/0081602 A1* | 3/2016 | Lisogurki | A61B 5/029 |
| | | | 600/476 |
| 2020/0067553 A1* | 2/2020 | Harada | H04B 1/38 |

FOREIGN PATENT DOCUMENTS

| | | | | |
|---|---|---|---|---|
| CN | 105846896 A | * | 8/2016 | ........... H04B 10/116 |
| CN | 105846896 A | | 8/2016 | |
| CN | 106130638 A | * | 11/2016 | ........... H04B 10/116 |
| CN | 107342812 A | | 11/2017 | |
| WO | 2020159006 A1 | | 8/2020 | |

\* cited by examiner

VISIBLE LIGHT COMMUNICATION SYSTEM WITH ADAPTIVE DIMMING AND MODULATION AND DEMODULATION METHOD

This application is the National Stage Application of PCT/CN2021/088356, filed on Apr. 20, 2021, which claims priority to Chinese Patent Application No. 202110272247.9, filed on Mar. 12, 2021, which is incorporated by reference for all purposes as if fully set forth herein.

FIELD OF THE INVENTION

The present invention relates to the field of optical communication technologies, and in particular to a visible light communication system with adaptive dimming and a modulation and demodulation method.

DESCRIPTION OF THE RELATED ART

With the development of 5G and big data technology, people have increasingly high demand for the speed and coverage of networks. For conventional electromagnetic wave communication, because electromagnetic waves cannot penetrate metal and spectrum resources are limited, signal coverage and transmission cannot be implemented for metal confinement and space requiring electromagnetic shielding. In recent years, indoor visible light communication systems using LEDs have become a popular technology to solve conventional electromagnetic wave communication for the advantages such as high rate, security, energy saving, environmental protection, and abundant spectrum resources. Although a visible light communication system has both lighting and communication functions, the former has a higher priority in the system design. In fact, the brightness levels of LEDs need to be adjusted to adapt to different application scenarios and energy saving and environmental protection requirements. Therefore, visible light communication systems supporting dimming control have become a popular research topic. However, due to limitations of the implementation principle and system complexity of such systems, it is still difficult to support both full range dimming control and stable signal transmission, which limits the popularization speed and application scope of the systems.

Chinese Patent Publication No. CN103763829A discloses an OFDM signal-based dimming method for a light source. In the method, a hybrid visible light communication system based on multi-pulse position modulation (MPPM) dimming control combines orthogonal frequency division multiplexing (OFDM) with MPPM to support high-speed visible light communication and also meet users' demand for brightness adjustment of a lighting source. This hybrid modulation method ensures that the system has the dimming function of MPPM and the introduced OFDM transmission can effectively improve the spectral efficiency. The transmission rate based on the MPPM dimming control scheme is limited by the size of the duty cycle of a dimming control signal. Therefore, when the demand for visible light intensity is low or even in a completely dark environment, this system cannot implement stable transmission of signals to implement all-optical domain dimming. In addition, this system does not consider a delay time of a rising edge and a delay time of a falling edge of an actual MPPM signal. In practice, the transmission of an OFDM signal is susceptible to the interference of the rising edge and the falling edge. As a result, a theoretical high transmission rate and a theoretical low bit error rate cannot be implemented.

Chinese Patent Publication No. 201610320643.3 discloses an infrared-compensated full-range dimming visible light OFDM communication device. The method can implement both full-range dimming and OFDM signal transmission, and the dimming has less impact on the transmission rate and transmission quality of OFDM signals, so that the dependence of signal transmission performance on the dimming duty cycle in conventional schemes can be reduced, and the system complexity can be effectively reduced.

The prior art has the following deficiencies:
1. The transmission rate based on the MPPM dimming control scheme is limited by the size of the duty cycle of a dimming control signal. Therefore, when the demand for visible light intensity is low or even in a completely dark environment, this system cannot implement stable transmission of signals to implement full range dimming control. In addition, this system does not consider a delay time of a rising edge and a delay time of a falling edge of an actual MPPM signal. In practice, the transmission of an OFDM signal is susceptible to the interference of the rising edge and the falling edge. As a result, a theoretical high transmission rate and a theoretical low bit error rate cannot be implemented.
2. For a visible light OFDM communication system using infrared-compensated full-range dimming, the rising and falling edges of a dimming pulse signal limit the alternate transmission of visible light and infrared signals. The step response characteristics of existing commercial visible light LEDs and infrared emitters are poor, and the rate and quality of alternate transmission will be greatly degraded if the delay time of rising and falling edges of high and low levels are not considered. This technical solution cannot effectively filter out signal interference of the falling edges of visible light and infrared LEDs, and the bit error rate and transmission rate are even inferior to those without adding an infrared-compensated transmission mode in specific duty cycles in some pulse modulation schemes.
3. In the visible light OFDM communication system using infrared-compensated full-range dimming, the separation of visible light and infrared signals cannot be implemented at a receive end, and the two signals interfere with each other at the receive end, leading to an increase in the bit error rate.
4. OFDM has high complexity, and has a long development cycle especially in real-time system implementation. In addition, an OFDM signal has a high peak-to-average ratio, requires a very large linear operating range of a light source, resulting in a very large maximum transmit power. Moreover, the costs of devices, driving circuits, and the like also rise, and higher power causes a worse frequency response, resulting in reduced bandwidth. In addition, as the use time of an LED elapses, an OFDM signal cannot automatically adapt to degraded performance of a lamp bead due to aging, resulting in signal distortion and an increased bit error rate. The use of an OFDM signal can only enhance the rate in an ideal experimental environment and is not applicable to specific practical application scenarios.
5. In the prior art, the delay time of the rising and falling edges, that is, the preparation time, during the actual implementation of the system may lead to lower transmission efficiency, mutual interference between dual-path hybrid signals, a higher bit error rate, and other problems.

SUMMARY OF THE INVENTION

For this, a technical problem to be resolved by the present invention is to provide a visible light communication system with adaptive dimming and a modulation and demodulation method. The system implements seamless and delay-less switching between dual-path signals of visible light and infrared light, so that an adaptive M-PAM modulation signal can be loaded at any time.

To resolve the foregoing technical problems, the present invention provides a visible light communication system with adaptive dimming, including:
a source;
an adaptive M-PAM modulator, connected to the source, where the adaptive M-PAM modulator separately modulates a signal transmitted by the source into a first electrical signal and a second electrical signal;
a visible light emitter, connected to the adaptive M-PAM modulator, where the visible light emitter converts the second electrical signal into visible light;
an infrared light emitter, connected to the adaptive M-PAM modulator, where the infrared light emitter converts the first electrical signal into infrared light; and
a dual-path pulse generator, alternately generating a first pulse control signal and a second pulse control signal, where the first pulse control signal and the second pulse control signal are both periodic signals, the first pulse control signal is connected to the visible light emitter to control the visible light emitter to operate, and the second pulse control signal is connected to the infrared light emitter to control the infrared light emitter to operate, where
when a remaining operating duration of a high level of the first pulse control signal is equal to a time of a rising edge of the second pulse control signal, the second pulse control signal starts to be generated, and
when a remaining operating duration of a high level of the second pulse control signal is equal to a time of a rising edge of the first pulse control signal, the first pulse control signal starts to be generated.

Preferably, the system further includes a first photoelectric sensor, a second photoelectric sensor, and an emitter controller, where the emitter controller is connected to the first photoelectric sensor and the second photoelectric sensor, where
the first photoelectric sensor acquires light intensity of visible light emitted by the visible light emitter, and the second photoelectric sensor acquires light intensity of infrared light emitted by the infrared light emitter; and
the emitter controller controls the adaptive M-PAM modulator and the dual-path pulse generator according to the light intensity of the first photoelectric sensor and the second photoelectric sensor.

Preferably, a receive end of the visible light communication system includes a third photoelectric sensor, a fourth photoelectric sensor, an analog switch, a receiver controller, and an adaptive M-PAM demodulator;
the third photoelectric sensor acquires a light signal emitted by the visible light emitter, and the fourth photoelectric sensor acquires a light signal emitted by the infrared light emitter;
the receiver controller is connected to the analog switch and the adaptive M-PAM demodulator; and
the analog switch is connected to the third photoelectric sensor and fourth photoelectric sensor to gate valid signals of a visible light signal and an infrared signal, and the valid signals are demodulated by the adaptive M-PAM demodulator and outputted to a sink.

Preferably, the system further includes a first visible light filter, a first infrared light filter, a second visible light filter, and a second infrared light filter, where
the first visible light filter is disposed at a detection end of the first photoelectric sensor, and the first infrared light filter is disposed at a detection end of the second photoelectric sensor; and
the second visible light filter is disposed at a detection end of the third photoelectric sensor, and the second infrared light filter is disposed at a detection end of the fourth photoelectric sensor.

The present invention discloses a modulation and demodulation method for a visible light communication system with adaptive dimming, based on the foregoing visible light communication system with adaptive dimming, and including the following steps:
obtaining optimal light intensity $I_0$ of an LED lamp of a light emitter upon delivery;
acquiring average light intensity $I_i$ of the LED lamp within one transmission period by using a photoelectric sensor;
calculating actual real-time light intensity attenuation $d_i=(I_0-I_i)/I_o$, and performing weighted operation according to theoretical light intensity attenuation $d(t)$ corresponding to use time of the LED lamp in a light attenuation curve of the LED lamp upon delivery, to obtain light attenuation $D=w_1 d_i+w_2 d(t)$, where $w_1$ and $w_2$ are weights;
dividing the light attenuation D into N levels, where N is determined by bandwidth of the LED lamp, it is specified that N=BW/100k, and a range of the light attenuation D on an $n^{th}$ level is $$\frac{n-1}{N} \sim \frac{n}{N} \times 100\%;$$

calculating, by an emitter controller, an order M=[32/n];
when the emitter controller detects that the order M needs to be changed, transmitting, by the emitter controller, a changed modulation order M' to an adaptive M-PAM modulator;
controlling, by the adaptive M-PAM modulator, the light emitter to use the current order M to emit a light signal with an order that needs to be changed, where the light signal with an order that needs to be changed carries the changed order M';
converting, by a photoelectric sensor of a receive end, the light signal carrying the modulation order M' into an electrical signal carrying the modulation order M';
obtaining, by a receiver controller, the electrical signal carrying the modulation order M', and obtaining the demodulation order M' according to the electrical signal carrying the modulation order M'; and
transmitting, by the receiver controller, the demodulation order M' to the adaptive M-PAM demodulator, and demodulating, by the adaptive M-PAM demodulator, a communication signal according to the demodulation order M'.

Preferably, the method includes:
when a dual-path pulse generator detects that transmitted data is the last data frame, controlling, by the dual-path pulse generator, the adaptive M-PAM modulator to generate an electrical signal carrying dual-path switching, controlling, by the adaptive M-PAM modulator, the light emitter to use the current order M to emit a dual-path switching indication signal, and the dual-path pulse generator returning to an off state.

Preferably, the method further includes:

when a control signal for changing the order M and a switching signal simultaneously reach the adaptive M-PAM modulator, controlling, by the emitter controller, the dual-path pulse generator to generate a light output with a transmission time of one data frame extended.

Preferably, the method further includes: calculating a delay time of a rising edge of a first pulse control signal and calculating a delay time of a rising edge of a second pulse control signal, where the calculating a delay time of a rising edge includes:

determining a light attenuation level of an LED of a light emitter corresponding to a pulse control signal, where the pulse control signal is the first pulse control signal or the second pulse control signal; and calculating a delay time $$t = T\left(1 - Ae^{-\frac{n}{N}}\right)$$

of a rising edge of a light ray emitted by the light emitter corresponding to the pulse control signal, where T is a delay time of a rising edge of an LED bead of the light emitter after test on the last level, A is an attenuation coefficient, and the attenuation coefficient is an absolute value of a tangent slope of a light attenuation curve of the LED bead upon delivery.

The present invention discloses a demodulation method for a visible light communication system with adaptive dimming, based on the foregoing visible light communication system with adaptive dimming, and including:

acquiring, by a third photoelectric sensor and a fourth photoelectric sensor, light signals, and converting the light signals into electrical signals;

gating, by an analog switch, valid signals of a visible light signal and an infrared signal, and inputting a gating result into a receiver controller;

when the receiver controller detects a change in a modulation order of a gate branch, outputting, by the receiver controller, a corresponding new demodulation order, and demodulating, by an adaptive M-PAM demodulator, the valid signals by using the new demodulation order; when the receiver controller detects no change in the modulation order of the gate branch, demodulating, by the adaptive M-PAM demodulator, the valid signals; and when the receiver controller detects a light path switching signal, transmitting, by the receiver controller, a switching instruction to the analog switch and the adaptive M-PAM demodulator, the analog switch switching to another light path, and performing, by the adaptive M-PAM demodulator, demodulation by using a demodulation order corresponding to the another light path.

Preferably, the method includes:

when the receiver controller detects a changed modulation order M' of an adaptive M-PAM modulator, obtaining, by the receiver controller, a demodulation order M' according to the modulation order M'; and transmitting, by the receiver controller, the demodulation order M' to the adaptive M-PAM demodulator to update a demodulation order.

Compared with the prior art, the technical solutions of the present invention has the following advantages:

1. The present invention can eliminate a delay problem caused by the rising and falling edges of an actual dimming pulse signal, thereby implementing seamless and delay-less alternate transmission of efficient hybrid signals.
2. In the present invention, an adaptive M-PAM signal does not depend on high-performance visible light and infrared LEDs, so that the deployment is simple and the portability is high.
3. The bit error rate is not limited by the use time and life of LEDs, and the most efficient adaptive M-PAM modulation order can be adaptively used.
4. Signals can be separated, so that a visible light signal and an infrared signal are independently transmitted, to avoid mutual interference, thereby effectively reducing the bit error rate.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
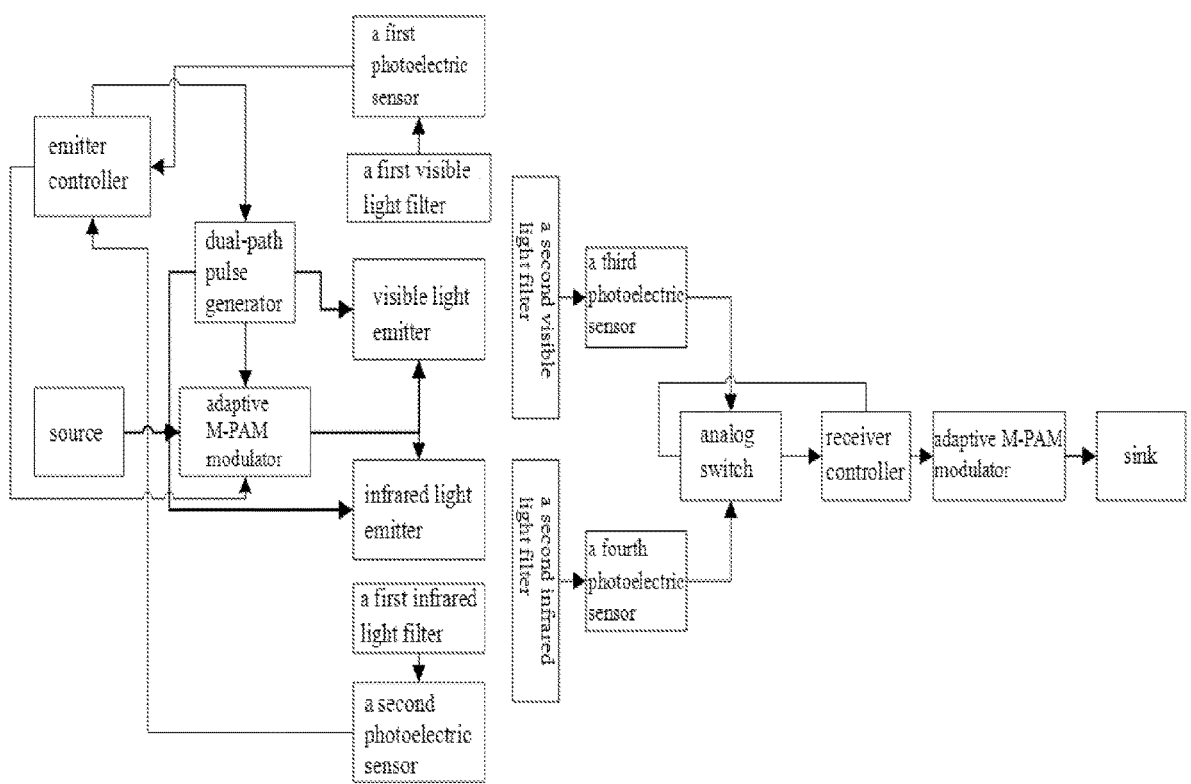
FIG. 1 is diagram of a visible light communication system with adaptive dimming according to the present invention.
Figure 2:
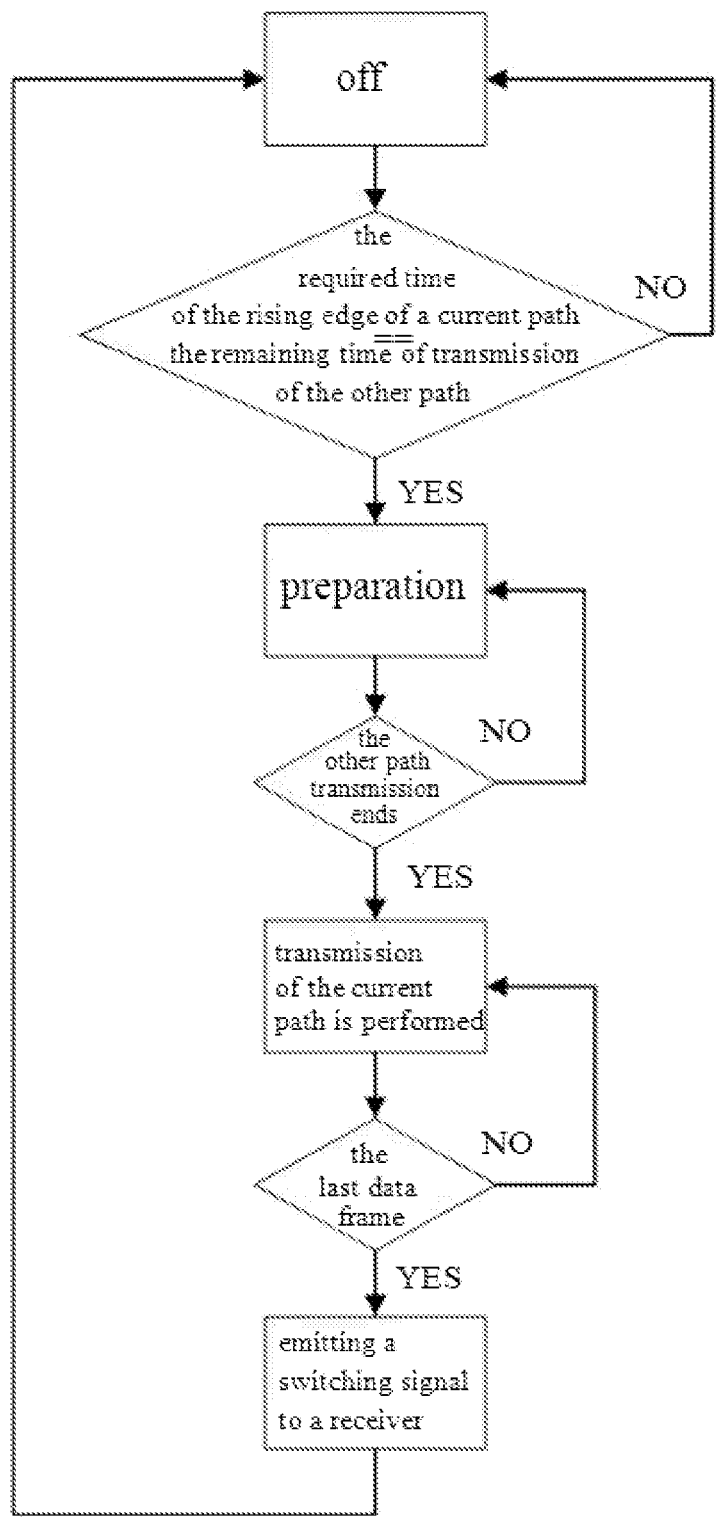
FIG. 2 is a flowchart of an algorithm of a dual-path pulse generator.
Figure 3:
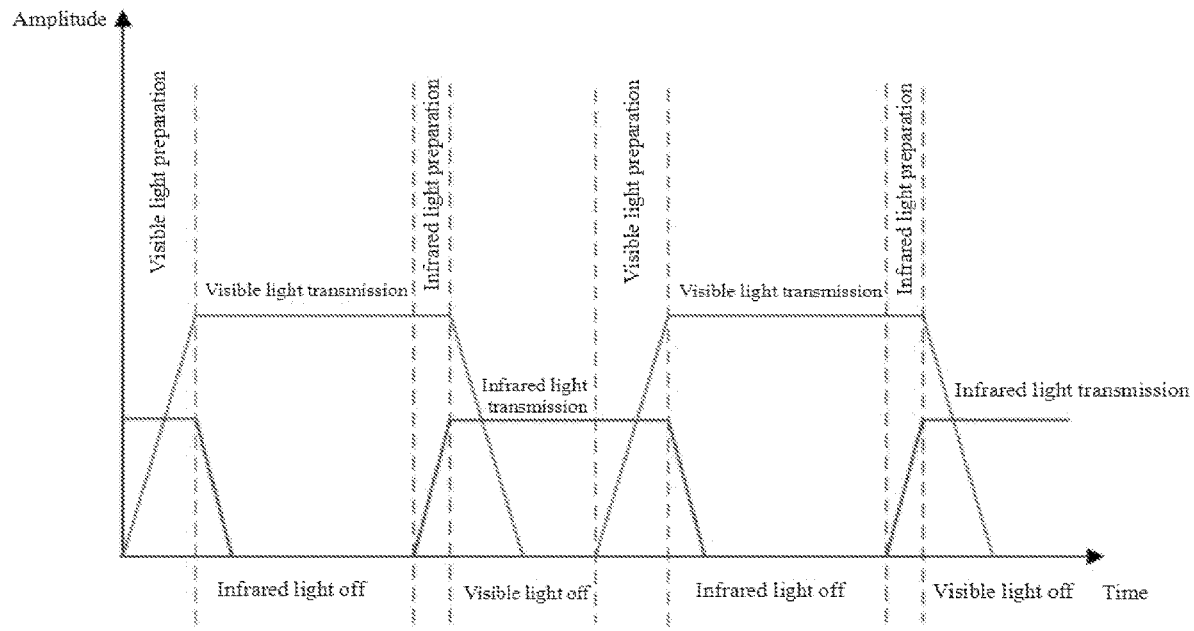
FIG. 3 is a diagram of a timing waveform of a dual-path pulse generator.

Referring to FIG. 1 to FIG. 3, the present invention discloses a visible light communication system with adaptive dimming, including a source, an adaptive M-PAM modulator, an emitter controller, a visible light emitter, an infrared light emitter, and a dual-path pulse generator.

The adaptive M-PAM modulator is connected to the source. The adaptive M-PAM modulator separately modulates a signal transmitted by the source into a first electrical signal and a second electrical signal.

The visible light emitter is connected to the adaptive M-PAM modulator. The visible light emitter converts the second electrical signal into visible light.

The infrared light emitter is connected to the adaptive M-PAM modulator. The infrared light emitter converts the first electrical signal into infrared light.

The dual-path pulse generator alternately generates a first pulse control signal and a second pulse control signal. The first pulse control signal and the second pulse control signal are both periodic signals. The first pulse control signal is connected to the visible light emitter to control the visible light emitter to operate. The second pulse control signal is connected to the infrared light emitter to control the infrared light emitter to operate.

When a remaining operating duration of a high level of the first pulse control signal is equal to a time of a rising edge of the second pulse control signal, the second pulse control signal starts to be generated. When a remaining operating duration of a high level of the second pulse control signal is equal to a time of a rising edge of the first pulse control signal, the first pulse control signal starts to be generated.

Referring to FIG. 2, the present invention discloses a dual-path pulse generation method, based on the foregoing visible light communication system with adaptive dimming, and including: when a remaining operating duration of a high level of the first pulse control signal is equal to a time of a rising edge of the second pulse control signal, starting to generate the second pulse control signal, to implement nonintermittent generation and delay-less switching of an infrared light signal and a visible light signal; and when transmitted data is the last data frame, emitting a switching indication signal to a receiver, and the dual-path pulse generator returning to an off state.

In the present invention, visible light and infrared are designed in three modes, namely, an off mode, a preparation mode, and a transmission mode. First, the required time of the rising edge of a current path is compared with the remaining time of transmission of the other path. If the two are equal, the rising edge of the current path is started to enter a preparation state of transmission. Information transmission of the current path is performed as soon as the transmission of the other path ends, thereby implementing switching nearly without a time delay. Next, if transmitted data is the last data frame, one switching indication signal is emitted to the receiver, and then the dual-path pulse generator returns to an off state. A diagram of a timing waveform of the dual-path pulse generator is shown in FIG. 3. In this way, seamless and delay-less switching between dual-path signals of visible light and infrared light is implemented, so that an adaptive M-PAM modulation signal can be loaded at any time. The present invention further includes a first photoelectric sensor, a second photoelectric sensor, and an emitter controller, where the emitter controller is connected to the first photoelectric sensor and the second photoelectric sensor. The first photoelectric sensor acquires light intensity of visible light emitted by the visible light emitter, and the second photoelectric sensor acquires light intensity of infrared light emitted by the infrared light emitter. The emitter controller controls the adaptive M-PAM modulator and the dual-path pulse generator according to the light intensity of the first photoelectric sensor and the second photoelectric sensor. A receive end of the visible light communication system includes a third photoelectric sensor, a fourth photoelectric sensor, an analog switch, a receiver controller, and an adaptive M-PAM demodulator. The third photoelectric sensor acquires a light signal emitted by the visible light emitter, and the fourth photoelectric sensor acquires a light signal emitted by the infrared light emitter. The receiver controller is connected to the analog switch and the adaptive M-PAM demodulator. The analog switch is connected to the third photoelectric sensor and the fourth photoelectric sensor to gate valid signals of a visible light signal and an infrared signal, and the valid signals are demodulated by the adaptive M-PAM demodulator and outputted to a sink.

The present invention further includes a first visible light filter, a first infrared light filter, a second visible light filter, and a second infrared light filter. The first visible light filter is disposed at a detection end of the first photoelectric sensor, and the first infrared light filter is disposed at a detection end of the second photoelectric sensor. The first visible light filter and the first infrared light filter allow only visible light to enter the first photoelectric sensor and infrared light to enter the second photoelectric sensor. The second visible light filter is disposed at a detection end of the third photoelectric sensor, and the second infrared light filter is disposed at a detection end of the fourth photoelectric sensor. The second visible light filter and the second infrared light filter are disposed to allow only infrared light to enter the fourth photoelectric sensor and visible light to enter the third photoelectric sensor.

The first photoelectric sensor has a low bandwidth requirement and only needs to detect the light intensity of visible light, and the sensor is sensitive in a visible light band. The second photoelectric sensor has a low bandwidth requirement and only needs to detect the light intensity of infrared light, and the sensor is sensitive in an infrared band. The third photoelectric sensor has a relatively high bandwidth requirement and detects a visible light communication signal, and the sensor is sensitive in a visible light band. The fourth photoelectric sensor has a relatively high bandwidth requirement and detects an infrared communication signal, and the sensor is sensitive in a visible light band.

The present invention further discloses a modulation and demodulation method for a visible light communication system with adaptive dimming, based on the foregoing visible light communication system with adaptive dimming, and including the following steps:

Step 1: Obtain optimal light intensity $I_0$ of an LED lamp of a light emitter upon delivery. The light emitter is a visible light emitter or an infrared emitter.

Step 2: Acquire average light intensity $I_i$ of the LED lamp within one transmission period by using a photoelectric sensor. The photoelectric sensor is a photoelectric sensor corresponding to the light emitter, the visible light emitter corresponds to a first photoelectric sensor, and the infrared light emitter corresponds to a second photoelectric sensor.

Step 3: Calculate actual real-time light intensity attenuation $d_i=(I_0-I_i)/I_o$, and perform weighted operation according to theoretical light intensity attenuation $d(t)$ corresponding to use time of the LED lamp in a light attenuation curve of the LED lamp upon delivery, to obtain light attenuation $D=w_1 d_i + w_2 d(t)$, where $w_1$ and $w_2$ are weights.

Step 4: Divide the light attenuation D into N levels, where N is determined by bandwidth of the LED lamp, it is specified that $N=BW/100k$, and a range of the light attenuation D on an $n^{th}$ level is $$\frac{n-1}{N} \sim \frac{n}{N} \times 100\%.$$

Step 5: An emitter controller calculates an order $M=[32/n]$. The emitter controller needs to separately obtain orders corresponding to visible light and infrared light. In this way, the adaptive M-PAM modulator may use the orders corresponding to visible light and infrared light to adjusting corresponding light rays.

Step 6: When the emitter controller detects that the order M needs to be changed, the emitter controller transmits a changed modulation order M' to an adaptive M-PAM modulator. The adaptive M-PAM modulator controls the light emitter to use the current order M to emit a light signal with an order that needs to be changed, where the light signal with an order that needs to be changed carries the changed order M'. A photoelectric sensor of a receive end converts the light signal carrying the modulation order M' into an electrical signal carrying the modulation order M'. A receiver controller obtains the electrical signal carrying the modulation order M', and obtains the demodulation order M' according to the electrical signal carrying the modulation order M'. The receiver controller transmits the demodulation order M' to the adaptive M-PAM demodulator, and the adaptive M-PAM demodulator demodulates a communication signal according to the demodulation order M'. In the foregoing manner, a modulation order of a transmit end is adaptively adjusted according to light intensity of the light emitter. During the adaptive adjustment of the modulation order of the transmit end, a demodulation order of the receive end may also change synchronously by using the foregoing steps, thereby implementing adaptive demodulation.

The foregoing modulation and demodulation method for a visible light communication system further includes: when a dual-path pulse generator detects that transmitted data is the last data frame, controlling, by the dual-path pulse generator, the adaptive M-PAM modulator to generate an electrical signal carrying dual-path switching, controlling, by the adaptive M-PAM modulator, the light emitter to use the current order M to emit a dual-path switching indication signal, and the dual-path pulse generator returning to an off state.

When a control signal for changing the order M and a switching signal simultaneously reach the adaptive M-PAM modulator, the emitter controller controls the dual-path pulse generator to generate a light output with a transmission time of one data frame extended.

In the present invention, a delay time of a rising edge of a first pulse control signal and a delay time of a rising edge of a second pulse control signal need to be calculated. The first pulse control signal is connected to the visible light emitter, and the second pulse control signal is connected to the infrared light emitter. The time of the rising edge of the first pulse control signal and the time of the rising edge of the second pulse control signal are separately obtained, so that seamless switching between infrared light emission and visible light emission can be implemented.

The calculating a delay time of a rising edge includes the following steps.

Step 1: Determine a light attenuation level of an LED of a light emitter corresponding to a pulse control signal, where the pulse control signal is the first pulse control signal or the second pulse control signal.

Step 2: Calculate a delay time $$t = T\left(1 - Ae^{-\frac{n}{N}}\right)$$

of a rising edge of a light ray emitted by the light emitter corresponding to the pulse control signal, where T is a delay time of a rising edge of an LED bead of the light emitter after test on the last level, A is an attenuation coefficient, and the attenuation coefficient is an absolute value of a tangent slope of a light attenuation curve of the LED bead upon delivery. Through the provided algorithm, an M order of adaptive M-PAM and a moment to start preparation in the dual-path pulse generator can be dynamically adjusted according to current performance of the bead, so that seamless and delay-less alternate transmission of two signals can be completed, and an adaptive M-PAM modulation signal can match the performance of the LED bead in real time, thereby reducing signal distortion caused by aging during use of devices and reducing the bit error rate. In the present invention, a bipolar adaptive M-PAM signal is used, so that the impact on dimming accuracy is small, and a high-accuracy dimming requirement can be satisfied, thereby improving the practicability and stability of the system.

The present invention further discloses a demodulation method for a visible light communication system with adaptive dimming, based on the foregoing visible light communication system with adaptive dimming, and including the following steps:

Step 1: A third photoelectric sensor and a fourth photoelectric sensor acquire light signals, and convert the light signals into electrical signals.

Step 2: An analog switch gates valid signals of a visible light signal and an infrared signal, and inputs a gating result into a receiver controller.

Step 3: When the receiver controller detects a change in a modulation order of a gate branch, the receiver controller outputs a corresponding new demodulation order, and an adaptive M-PAM demodulator demodulates the valid signals by using the new demodulation order; and when the receiver controller detects no change in the modulation order of the gate branch, the adaptive M-PAM demodulator demodulates the valid signals. When the receiver controller detects a light path switching signal, the receiver controller transmits a switching instruction to the analog switch and the adaptive M-PAM demodulator, the analog switch switches to another light path, and the adaptive M-PAM demodulator performs demodulation by using a demodulation order corresponding to the another light path.

Specifically, when the receiver controller detects a changed modulation order M' of an adaptive M-PAM modulator, the receiver controller obtains a demodulation order M' according to the modulation order M'. The receiver controller transmits the demodulation order M' to the adaptive M-PAM demodulator to update a demodulation order.

The beneficial effects of the present invention are as follows:

1. The present invention can eliminate a delay problem caused by the rising and falling edges of an actual dimming pulse signal, thereby implementing seamless and delay-less alternate transmission of efficient hybrid signals.
2. An adaptive M-PAM signal does not depend on high-performance visible light and infrared LEDs, so that the deployment is simple and the portability is high.
3. The bit error rate is not limited by the use time and life of LEDs, and the most efficient adaptive M-PAM modulation order can be adaptively used.
4. Signals can be separated, so that a visible light signal and an infrared signal are independently transmitted, to avoid mutual interference, thereby effectively reducing the bit error rate.
5. A bipolar adaptive M-PAM signal is used, and a mean value of the amplitude of the signal is 0, so that dimming accuracy is not affected.

The solutions of the present invention are further described below with reference to specific embodiments.

To evaluate the provided visible light communication system with adaptive dimming, the transmission rate and bit error rate of the system are evaluated in different duty cycles and use time of LEDs. The present invention is applied below in a case that the duty cycle is 35.8% to implement data transmission with a rate of 10 Mbit/s. Compared with an existing visible light communication system that uses adaptive M-PAM modulation and supports dimming control, the rate is increased by 13.6%, and the bit error rate is stably lower than $10^{-4}$.

Table 1 shows a correspondence relationship between the service life of visible light and infrared LEDs and adaptive M-PAM modulation orders thereof.

TABLE 1

| | | | | | |
|---|---|---|---|---|---|
| Use duration of a visible light LED/h | 0-2500 | 2500-6000 | 6000-8000 | 8000-10000 | 10000+ |
| Adaptive M-PAM modulation order of visible light | 32 | 16 | 8 | 4 | 2 |
| Use duration of an infrared LED/h | 0-1600 | 1600-4800 | 4800-6400 | 6400-8000 | 8000+ |
| Adaptive M-PAM modulation order of infrared light | 32 | 16 | 8 | 4 | 2 |

As shown in Table 1, when the visible light and infrared LEDs have the optimal performance, adaptive M-PAM-32 is used to perform modulation and demodulation. Subsequently, adaptive M-PAM orders of two paths are adjusted and mixed according to aging degrees of the LEDs, to reduce the signal distortion and bit error rate.

Figure 4:
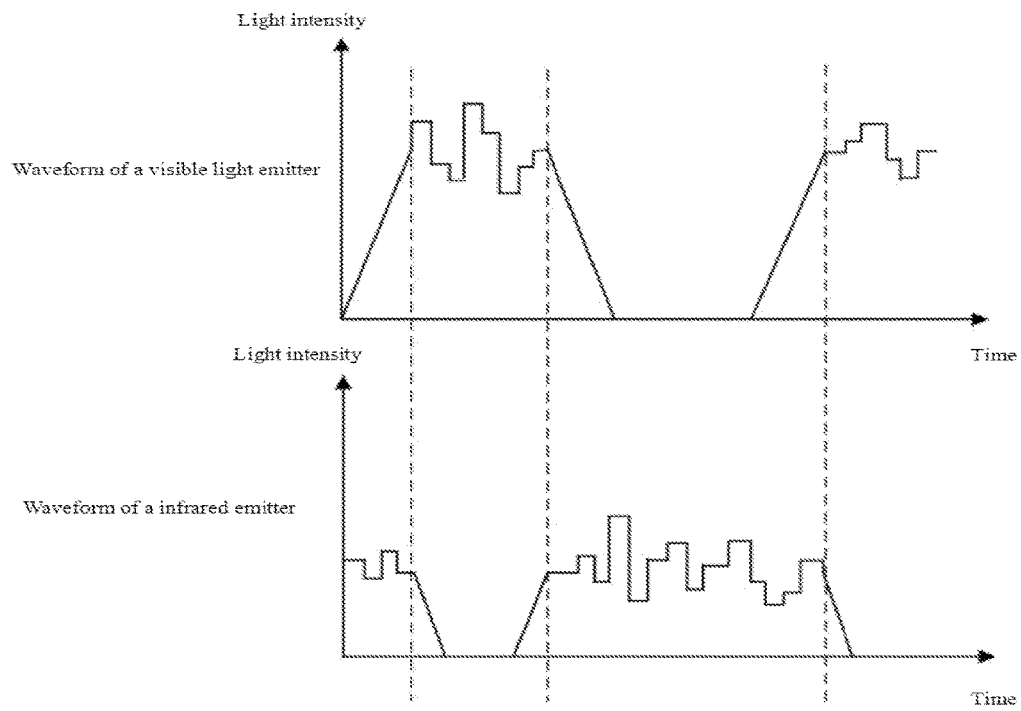
FIG. 4 shows a typical waveform of a visible light emitter and an infrared emitter within one dimming pulse period.
Figure 5:
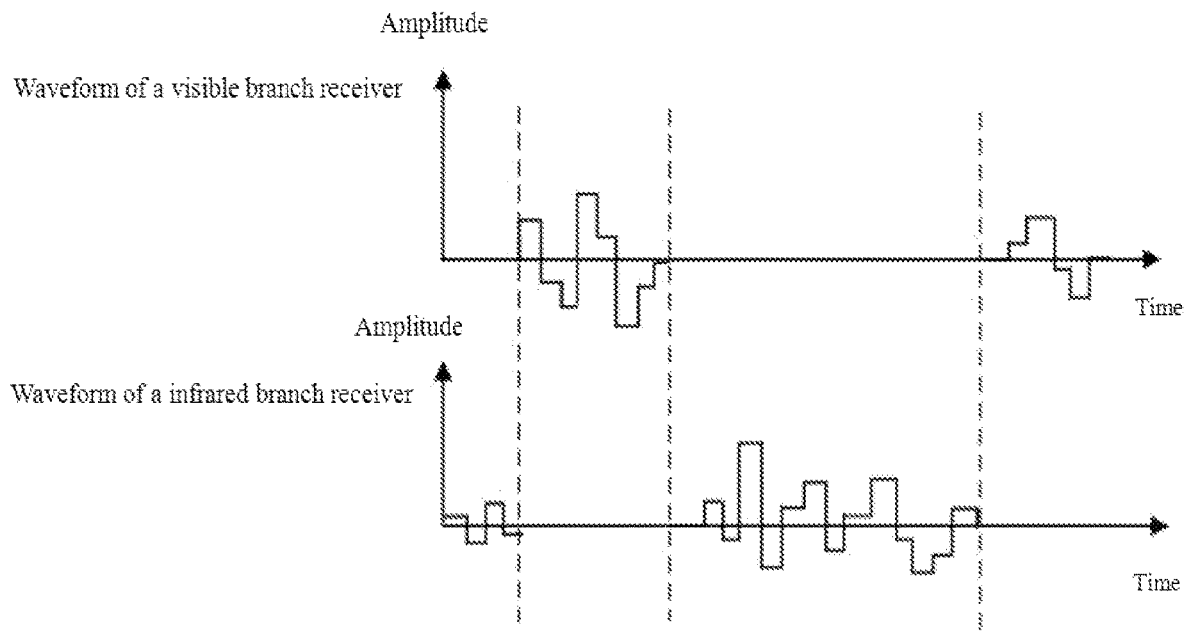
FIG. 5 shows the waveform of a signal entering an adaptive M-PAM demodulator.

FIG. 4 shows a typical waveform of a visible light emitter and an infrared emitter within one dimming pulse period. FIG. 5 shows the waveform of a signal entering an adaptive M-PAM demodulator. By means of the provided system, seamless and delay-less emission of visible light and infrared signals is implemented at a transmit end, and through the control of two photoelectric sensors, an analog switch, and a receiver controller at a receive end, signal separation is implemented, so that mutual interference between falling edge signals of visible light and infrared light is eliminated, thereby reducing signal distortion.

Figure 6:
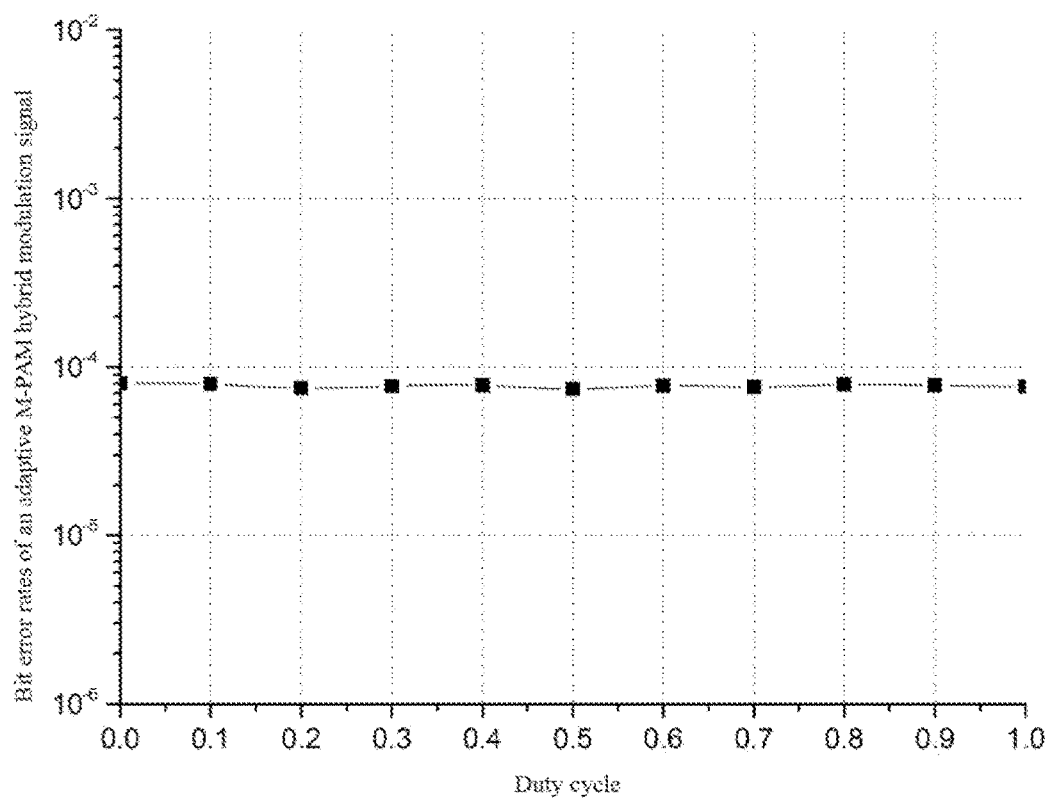
FIG. 6 shows bit error rates of an adaptive M-PAM hybrid modulation signal in different duty cycles.

As shown in FIG. 6, in different duty cycles, the bit error rate of transmission of an adaptive M-PAM hybrid modulation signal is stably less than $10^{-4}$, so that the stability of the system is improved.

The present invention has the following advantages:
1. The present invention provides a visible light communication system with adaptive dimming that can implement seamless and delay-less alternate transmission of efficient hybrid signals.
2. The dual-path dimming pulse generator has a design of three modes for a signal, that is, an off mode, a preparation mode, and a transmission mode.
3. In the present invention, a method for generating dual-path dimming pulse signals with seamless and delay-less alternate switching is provided, and a method for adding an indication signal to the last transmitted data frame to implement clock synchronization is provided.
4. According to the service life of LEDs, the order of an adaptive M-PAM signal is adjusted, and a delay time of a rising edge is calculated.
5. Two signals are separated at a receive end, so that the interference of a falling edge with the receive end is eliminated.
6. In the present invention, a bipolar adaptive M-PAM signal is used to replace an original OFDM signal, so that the actual implementation complexity of the system is reduced, and the portability is enhanced. In addition, instead of using a constant modulation order, the M-PAM modulation order can be dynamically adjusted according to a use duration of a bead, so that the actual stability of the system is improved without depending on a bead with lasting high performance. Moreover, the bipolar adaptive M-PAM signal does not affect dimming accuracy.
7. In the present invention, according to delay time of rising and falling edges in an actual implementation system, three modes, that is, an off mode, a preparation mode, and a transmission mode, are designed for switching, so that in addition to visible light and infrared light, the interval, delay, and signal synchronization problems during alternate transmission of any dual-path or multi-path hybrid signals are solved.
8. In the present invention, complete signal separation is implemented at the receive end, so that there is almost no mutual interference between hybrid signals, and a determination step for the hybrid signals is not required, so that the transmission quality and efficiency are effectively improved.

A person skilled in the art should understand that the embodiments of the present application may be provided as a method, a system or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A visible light communication system with adaptive dimming, comprising:
    a source;
    an adaptive M-PAM modulator, connected to the source, wherein the adaptive M-PAM modulator separately modulates a signal transmitted by the source into a first electrical signal and a second electrical signal;
    a visible light emitter, connected to the adaptive M-PAM modulator, wherein the visible light emitter converts the second electrical signal into visible light;
    an infrared light emitter, connected to the adaptive M-PAM modulator, wherein the infrared light emitter converts the first electrical signal into infrared light; and
    a dual-path pulse generator, alternately generating a first pulse control signal and a second pulse control signal, wherein the first pulse control signal and the second pulse control signal are both periodic signals, the first pulse control signal is connected to the visible light emitter to control the visible light emitter to operate, and the second pulse control signal is connected to the infrared light emitter to control the infrared light emitter to operate, wherein
    when a remaining operating duration of a high level of the first pulse control signal is equal to a time of a rising edge of the second pulse control signal, the second pulse control signal starts to be generated, and
    when a remaining operating duration of a high level of the second pulse control signal is equal to a time of a rising edge of the first pulse control signal, the first pulse control signal starts to be generated.

2. The visible light communication system with adaptive dimming according to claim 1, further comprising a first photoelectric sensor, a second photoelectric sensor, and an emitter controller, wherein the emitter controller is connected to the first photoelectric sensor and the second photoelectric sensor, wherein
    the first photoelectric sensor acquires light intensity of visible light emitted by the visible light emitter, and the second photoelectric sensor acquires light intensity of infrared light emitted by the infrared light emitter; and
    the emitter controller controls the adaptive M-PAM modulator and the dual-path pulse generator according to the light intensity of the first photoelectric sensor and the second photoelectric sensor.

3. The visible light communication system with adaptive dimming according to claim 2, wherein a receive end of the visible light communication system comprises a third photoelectric sensor, a fourth photoelectric sensor, an analog switch, a receiver controller, and an adaptive M-PAM demodulator;
    the third photoelectric sensor acquires a light signal emitted by the visible light emitter, and the fourth photoelectric sensor acquires a light signal emitted by the infrared light emitter;
    the receiver controller is connected to the analog switch and the adaptive M-PAM demodulator; and
    the analog switch is connected to the third photoelectric sensor and the fourth photoelectric sensor to gate valid signals of visible light signals and infrared signals, and the valid signals are demodulated by the adaptive M-PAM demodulator and outputted to a sink.

4. The visible light communication system with adaptive dimming according to claim 3, further comprising a first visible light filter, a first infrared light filter, a second visible light filter, and a second infrared light filter, wherein
    the first visible light filter is disposed at a detection end of the first photoelectric sensor, and the first infrared light filter is disposed at a detection end of the second photoelectric sensor; and
    the second visible light filter is disposed at a detection end of the third photoelectric sensor, and the second infrared light filter is disposed at a detection end of the fourth photoelectric sensor.

5. A demodulation method for a visible light communication system with adaptive dimming, based on the visible light communication system with adaptive dimming according to claim 3, and comprising:
    acquiring, by a third photoelectric sensor and a fourth photoelectric sensor, light signals, and converting the light signals into electrical signals;
    gating, by an analog switch, valid signals of visible light signals and infrared signals, and inputting a gating result into a receiver controller;
    when the receiver controller detects a change in a modulation order of a gate branch, outputting, by the receiver controller, a corresponding new demodulation order, and demodulating, by an adaptive M-PAM demodulator, the valid signals by using the new demodulation order; when the receiver controller detects no change in the modulation order of the gate branch, demodulating, by the adaptive M-PAM demodulator, the valid signals; and
    when the receiver controller detects a light path switching signal, transmitting, by the receiver controller, a switching instruction to the analog switch and the adaptive M-PAM demodulator, the analog switch switching to another light path, and performing, by the adaptive M-PAM demodulator, demodulation by using a demodulation order corresponding to the another light path.

6. The demodulation method for a visible light communication system with adaptive dimming according to claim 5, comprising:

when the receiver controller detects a changed modulation order M' of an adaptive M-PAM modulator, obtaining, by the receiver controller, a demodulation order M' according to the modulation order M'; and transmitting, by the receiver controller, the demodulation order M' to the adaptive M-PAM demodulator to update a demodulation order.

7. A modulation and demodulation method for a visible light communication system with adaptive dimming, based on the visible light communication system with adaptive dimming according to claim 1, comprising steps of:

obtaining optimal light intensity $I_0$ of an LED lamp of a light emitter upon delivery;

acquiring average light intensity $I_t$ of the LED lamp within one transmission period by using a photoelectric sensor;

calculating actual real-time light intensity attenuation $d_i=(I_0-I_t)/I_o$, and performing weighted operation according to theoretical light intensity attenuation d(t) corresponding to use time of the LED lamp in a light attenuation curve of the LED lamp upon delivery, to obtain light attenuation $D=w_1 d_i+w_2 d(t)$, wherein $w_1$ and $w_2$ are weights;

dividing the light attenuation D into N levels, wherein N is determined by bandwidth of the LED lamp, it is specified that N=BW/100k, and a range of the light attenuation D on an $n^{th}$ level is $$\frac{n-1}{N} \sim \frac{n}{N} \times 100\%;$$

calculating, by an emitter controller, an order M=[32/n];

when the emitter controller detects that the order M needs to be changed, transmitting, by the emitter controller, a changed modulation order M' to an adaptive M-PAM modulator;

controlling, by the adaptive M-PAM modulator, the light emitter to use the current order M to emit a light signal with an order that needs to be changed, wherein the light signal with an order that needs to be changed carries the changed order M';

converting, by a photoelectric sensor of a receive end, the light signal carrying the modulation order M' into an electrical signal carrying the modulation order M';

obtaining, by a receiver controller, the electrical signal carrying the modulation order M', and obtaining the demodulation order M' according to the electrical signal carrying the modulation order M'; and transmitting, by the receiver controller, the demodulation order M' to the adaptive M-PAM demodulator, and demodulating, by the adaptive M-PAM demodulator, a communication signal according to the demodulation order M'.

8. The modulation and demodulation method for a visible light communication system according to claim 5, comprising:

when a dual-path pulse generator detects that transmitted data is the last data frame, controlling, by the dual-path pulse generator, the adaptive M-PAM modulator to generate an electrical signal carrying dual-path switching, controlling, by the adaptive M-PAM modulator, the light emitter to use the current order M to emit a dual-path switching indication signal, and the dual-path pulse generator returning to an off state.

9. The modulation and demodulation method for a visible light communication system according to claim 7, further comprising:

when a control signal for changing the order M and a switching signal simultaneously reach the adaptive M-PAM modulator, controlling, by the emitter controller, the dual-path pulse generator to generate a light output with a transmission time of one data frame extended.

10. The modulation and demodulation method for a visible light communication system according to claim 7, further comprising: calculating a delay time of a rising edge of a first pulse control signal and calculating a delay time of a rising edge of a second pulse control signal, wherein the calculating a delay time of a rising edge comprises:

determining a light attenuation level of an LED of a light emitter corresponding to a pulse control signal, wherein the pulse control signal is the first pulse control signal or the second pulse control signal; and calculating a delay time $$t = T\left(1 - Ae^{-\frac{n}{N}}\right)$$

of a rising edge of a light ray emitted by the light emitter corresponding to the pulse control signal, wherein T is a delay time of a rising edge of an LED bead of the light emitter after test on the last level, A is an attenuation coefficient, and the attenuation coefficient is an absolute value of a tangent slope of a light attenuation curve of the LED bead upon delivery.

* * * * *